Jan. 25, 1938.  A. W. SIMMONS  2,106,471
FLUID PRESSURE BRAKE
Filed Oct. 16, 1936  2 Sheets-Sheet 1
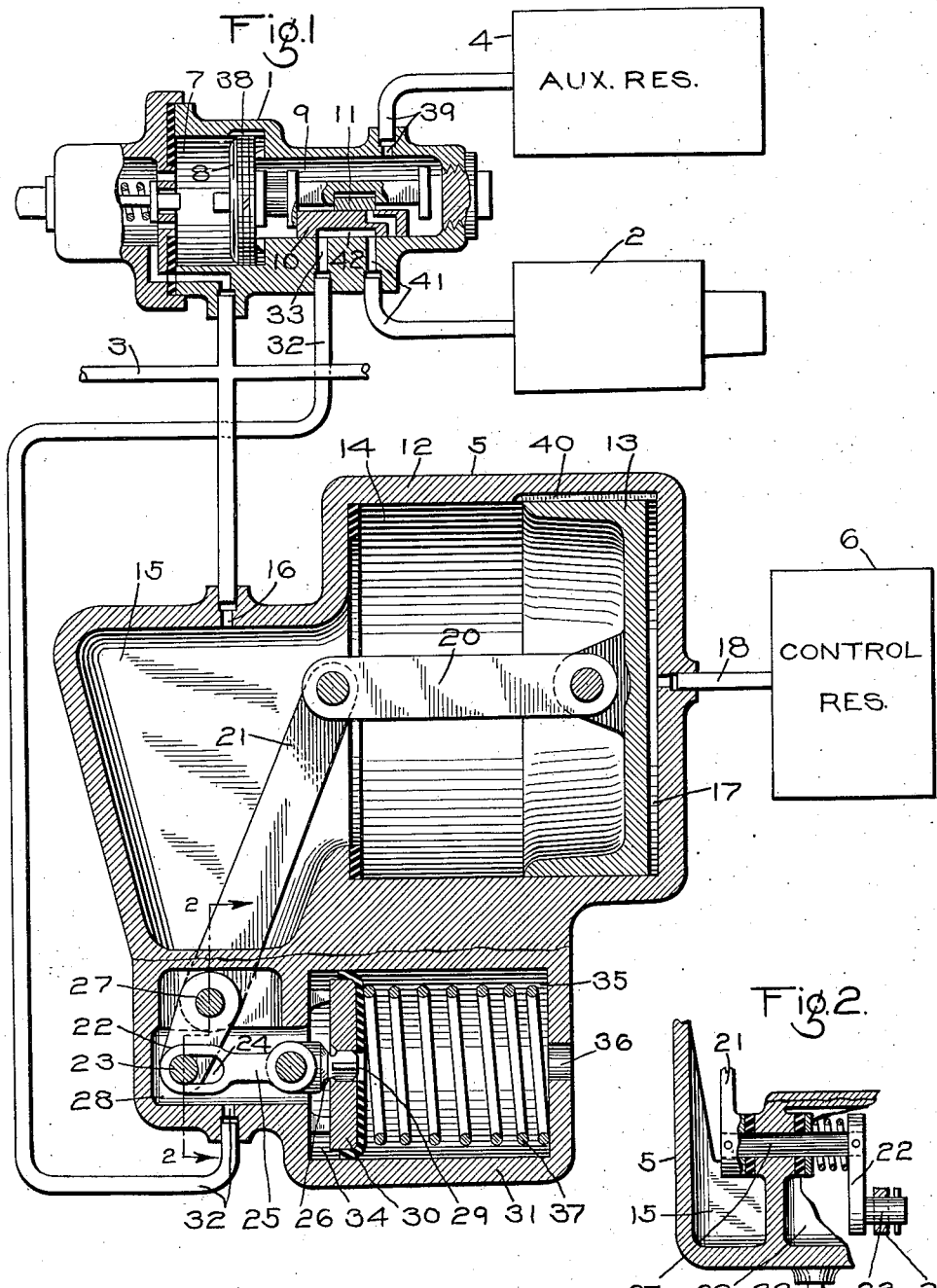
INVENTOR
ARTHUR W. SIMMONS
BY Wm. M. Cady
ATTORNEY

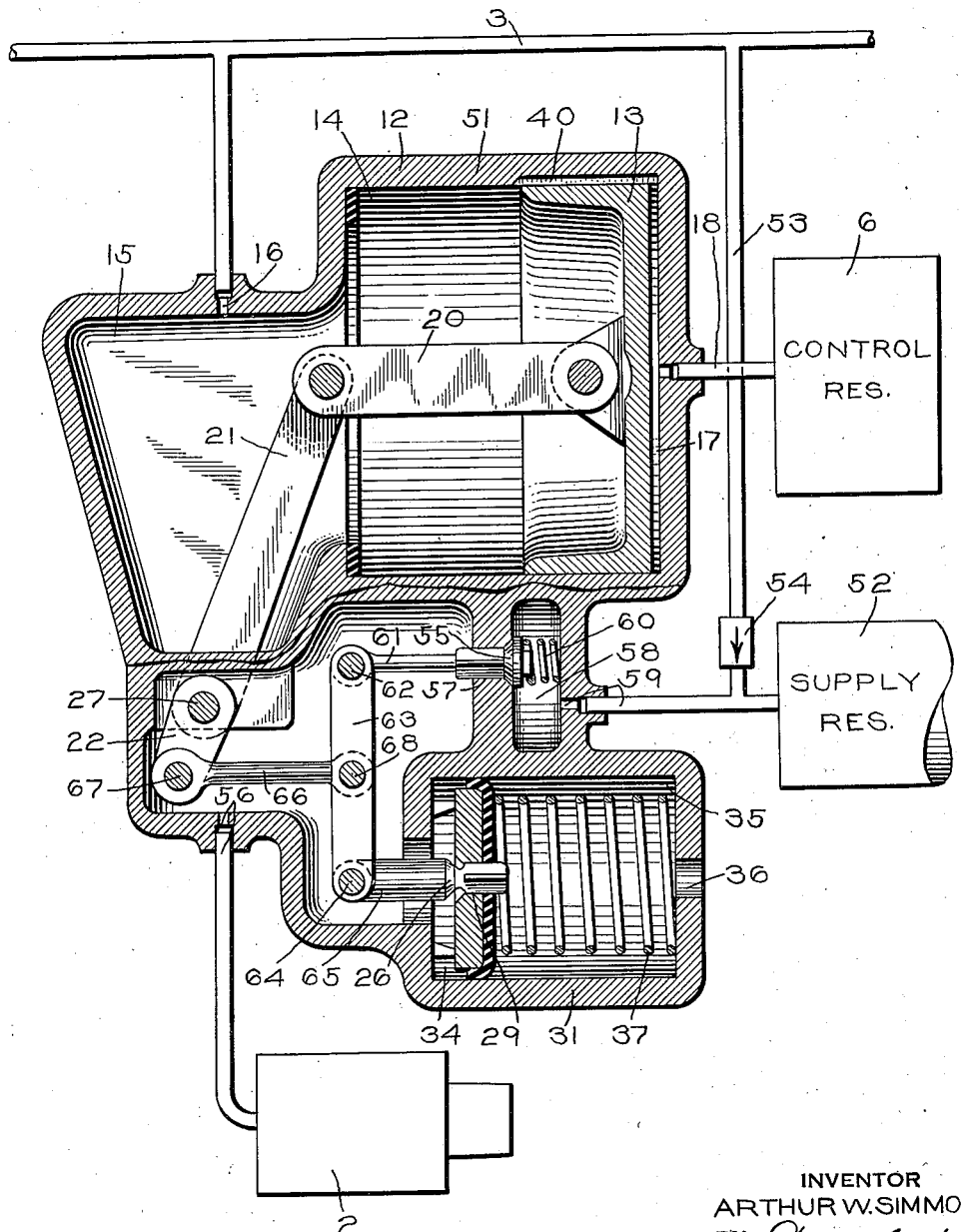

Patented Jan. 25, 1938

2,106,471

UNITED STATES PATENT OFFICE 2,106,471

FLUID PRESSURE BRAKE

Arthur William Simmons, King's Cross, London, England, assignor to The Westinghouse Air Brake Company, Wilmerding, Pa., a corporation of Pennsylvania Application October 16, 1936, Serial No. 105,964
In Great Britain December 17, 1935

7 Claims. (Cl. 303—74)

This invention relates to fluid pressure brake apparatus of the type in which the application of the brakes is adapted to be effected upon a reduction in brake pipe pressure and the release of the brakes is adapted to be effected upon an increase in brake pipe pressure, the invention having for its principal object to provide apparatus of this character with improved means which may be designed for operation with a triple valve device or other distributing valve device for graduating the release of the brakes or which may be designed for graduating both the application and release of the brakes in case it is desired to omit the triple valve device.

According to this object, the improved means comprises a graduating valve device having a movable abutment subject in one direction to the pressure of fluid in the brake pipe and in the opposite direction to the pressure of fluid in a control chamber, this latter pressure being, under full release conditions, the standard brake pipe pressure. According to the invention, the abutment moves outwardly in response to a reduction in brake pipe pressure in effecting an application of the brakes and, in so moving, automatically effects a corresponding reduction in the control chamber pressure, the extent of such movement of the abutment being dependent upon the degree of reduction in brake pipe pressure. The abutment thus positioned is adapted to move inwardly in response to an increase in brake pipe pressure, in effecting the release of the brakes, a distance corresponding to the degree of increase in brake pipe pressure to condition the device to automatically function to cut off the release of fluid under pressure from the brake cylinder and thereby limit the reduction in brake cylinder pressure in accordance with the increase in brake pipe pressure. From this, it will be understood that when the brake pipe pressure is increased in steps or increments the valve device functions to effect a graduated release of the brakes according to the steps or increments of increase in brake pipe pressure.

According to a further feature of the invention, a space on that side of the abutment which is subject to control chamber pressure is arranged to form a substantial part of the control chamber capacity so that the movement of the abutment due to a variation in brake pipe pressure from its normal value automatically effects a corresponding change in the total capacity of the control chamber and thus varies the pressure within the control chamber. The abutment will thus under all conditions of brake pipe pressure, in effecting either the application or release of the brakes, assume a position such that the pressures on opposite sides of the abutment are equal to one another and any risk of leakage of fluid from or into the control chamber past the abutment is thus obviated.

These and other features of the invention will appear in the following more detailed description.

In the accompanying drawings, Fig. 1 is a diagrammatic view, mainly in section, of a vehicle fluid pressure brake apparatus embodying one form of my invention; Fig. 2 is a fragmentary cross-sectional view taken on the line 2—2 of Fig. 1 and illustrating certain details of the graduated release valve device and Fig. 3 is a diagrammatic view, mainly in section, of a fluid pressure brake equipment embodying another form of the invention.

As shown in Fig. 1 of the drawings, the equipment may comprise a triple valve device 1, a brake cylinder 2, a brake pipe 3, an auxiliary reservoir 4, all of the usual construction, and according to my invention also comprises a valve mechanism 5 for graduating the release of the brakes and a control reservoir 6.

The triple valve device 1 comprises a casing, having a piston chamber 7 connected to the brake pipe 3 and containing a piston 8, and a valve chamber 9 connected to the auxiliary reservoir 4 and containing the usual main slide valve 10 and graduating valve 11 adapted to be operated by piston 8.

The valve mechanism 5 comprises a casing which has formed therein a cylinder 12 containing an abutment in the form of a piston 13, hereinafter termed the control piston, one end 14 of the cylinder 12 being in open communication with a chamber 15 communicating through a passage 16 with the brake pipe 3, the opposite end 17 of the cylinder 12 similarly communicating through a pipe 18 with the control chamber or reservoir 6.

The control piston 13 is mechanically coupled by means of a suitable link or pivotally connected piston rod 20 to the end of the longer arm 21 of a rocking lever, the shorter arm 22 of which is provided with a pin or projection 23 adapted to move in a slot 24 formed in one end of a link 25, the opposite end of which is pivotally connected to a valve 26, hereinafter termed the release valve. The rocking lever and its pivot 27 are so arranged that movement will be transmitted from the longer arm 21 to the shorter arm 22 of the rocking lever which is located in a chamber 28 in the casing of the device separated from the chamber 15 in such a manner that leakage from the chamber 15 to the chamber 28 is prevented.

The release valve 26 is as shown, of the poppet type and is located in a valve port 29 centrally arranged in a second piston 30, hereinafter termed the release piston, which is contained in a release cylinder 31 having its axis parallel to the cylinder 12. The chamber 28 containing the slotted link 25 is in communication through a passage and pipe 32 with the exhaust port 33 of the triple or other distributing valve device of the apparatus and is also in open communication with the adjacent end 34 of the release cylinder 31, the opposite end 35 of which is in communication with the atmosphere through a port 36 and contains a control spring 37 tending to maintain the release piston 30 at the end 34 of the release cylinder 31.

In operation, to charge the apparatus fluid under pressure is supplied to the brake pipe 3 in the usual manner. With the triple valve device in release position as shown in Fig. 1 fluid under pressure flows from the brake pipe to the triple valve piston chamber 7 and from thence flows through feed groove 38 to the slide valve chamber 9 and from thence through a passage and pipe 39 to the auxiliary reservoir 4. Fluid under pressure flows from the brake pipe through passage 16 to the chamber 15 in the casing of the valve mechanism 5 and from thence flows to the end 14 of the cylinder 12.

Under release conditions the control piston 13 is maintained at the right hand or control chamber end of its cylinder 12 as shown and the control chamber 6 is charged with fluid from the opposite end 14 of the control cylinder 12 through a feed groove 40 which is uncovered when the control piston 13 occupies this position. The release piston 30 is maintained in its extreme left hand position, as shown, within its cylinder 31 under the action of the control spring 37 and the pin 23 on the shorter arm 22 of the rocking lever is in engagement with the left hand end of the slot 24 in the link 25 thereby maintaining the release valve 26 in its open position.

Under these conditions it will be evident that the pressure obtaining at both ends 14 and 17 of the control cylinder 12 and in the control chamber 6 is the normal or standard brake pipe pressure, while owing to the release valve 26 being open, and the triple valve device being in release position communication is established through this valve between the brake cylinder and the atmosphere by way of passage 41, a brake cylinder pipe and a cavity 42 in the main slide valve 10 of the triple valve device, exhaust port 33 of the triple valve device, pipe and passage 32, chamber 28 in the release control valve device, past the open valve 26, release cylinder 31 and the port 36.

When the brake pipe pressure is reduced upon effecting an application of the brakes, the triple valve piston 8 and associated slide valves 10 and 11 move to release position in which the main slide valve cuts off the exhaust communication from the brake cylinder to the exhaust passage 33 and brings the usual service port 43 into registration with the brake cylinder passage 41 so that fluid under pressure is supplied from the auxiliary reservoir to the brake cylinder. The pressure in the chamber 15 and the left hand end 14 of the cylinder 12 correspondingly reduces with brake pipe pressure and the piston 13 accordingly moves towards the left, covering the feed groove 40 and permitting the fluid contained in the control chamber 6 to expand into the space formed at the end 17 of the cylinder 12 on the right hand side of the control piston 13 due to its movement towards the left. The pressure in the control chamber 6 is thus reduced, the movement of the control piston 13 continuing until this pressure is equal to the pressure in the end 14 and chamber 15 on the opposite side of the piston 13 so that the position eventually assumed by the control piston 13 will accurately correspond to the reduction in brake pipe or pressure effected.

It should be noted that since the pressures on each side of the piston 13 in the position finally assumed thereby are substantially equal to one another, as was the case before this movement of the piston 13 took place, there is no tendency for fluid to escape from the control chamber 6 past the piston 13. The movement of the control piston 13 transmitted through the longer arm 21 and the shorter arm 22 of the rocking lever will cause the pin 23 on the shorter arm 22 of this lever to move within the slot 24 in the link 25 towards the right hand end of the slot 24, the release valve 26 still, however, remaining open.

When it is desired to effect a graduated release of the brakes, the brake pipe pressure and auxiliary reservoir pressure are increased in the usual manner with the result that the control piston 13 will move towards the right, thereby increasing the pressure in the control chamber 6 until this pressure is again equal to the increased brake pipe pressure acting on the opposite side of the piston 13, whereupon the latter will come to rest in a position corresponding to the restored brake pipe pressure.

The increase in the brake pipe pressure above referred to will, in the usual manner, cause the triple valve to move to its release position in which communication is established between the brake cylinder and the brake cylinder exhaust port 33 so that the brake cylinder will be in communication with the chamber 28. The brake cylinder pressure thus established in the chamber 28 and in the end 34 of the cylinder 31 will cause the release valve 26 to move to its closed position in the valve port 29, this movement of the valve 26 being permitted owing to the pin 23 being out of engagement with the left hand end of the slot 24 in the link 25.

The pressure in the end 34 of the cylinder 31 will also act upon the left hand side of the release piston 30, causing this piston to move towards the right against the opposing action of the control spring 37. The release piston 30 during this movement will carry with it the release valve 26 until the movement of this valve is arrested by the engagement of the left hand end of the slot 24 in the link 25 with the pin 23 on the shorter arm 22 of the rocking lever. The release piston 30 will, however, continue its movement towards the right under the action of the brake cylinder pressure in the end 34 of the cylinder 31 with the result that the valve port 29 in the piston 30 will be opened and fluid under pressure from the brake cylinder will flow through this port to the right hand end 35 of the release cylinder 31 and thence to the atmosphere through the port 56. Fluid will thus be released from the brake cylinder until the pressure therein is sufficiently reduced to permit the release piston 30 to move towards the left under the action of the control spring 37 so as to reclose the release valve 26 whereupon further release of fluid from the brake cylinder will be prevented.

It will thus be seen that the pressure retained in the brake cylinder will depend upon the position occupied by the control piston 13 and the rocking lever as determined by the extent of restoration of the brake pipe pressure towards its normal value. Upon a further increase in brake pipe pressure, the control piston 13 assuming a position further towards the right, thereby reopening the release valve 26 and permitting the further release of fluid under pressure from the brake cylinder until the pressure therein has fallen to a value permitting a movement of the release piston 30 towards the left to reclose the release valve 26.

In the manner above explained the graduated release of fluid under pressure from the brake cylinder can evidently be obtained by a corresponding graduated increase in the brake pipe pressure until when this pressure is fully restored to its normal value, the control piston 13 will again be in its extreme right hand position and the release valve 15 will be maintained permanently open.

The degree of pressure retained in the brake cylinder at each corresponding step in the restoration of the brake pipe or auxiliary reservoir pressure towards its normal value can evidently be adjusted by adjusting the action of the controlling spring 37.

As shown in Fig. 3 of the drawings the equipment may comprise the brake cylinder 2, brake pipe 3, and, according to the invention may comprise a valve mechanism 51 for graduating the application and release of the brakes, a control reservoir 6 and a supply reservoir 52 which is adapted to be charged with fluid under pressure from the brake pipe by way of a branch pipe 53 and a check valve device 54 which is interposed between said pipe and a pipe 59 connected to the reservoir, said check valve device being operative to prevent back flow of fluid from the reservoir 52 to the brake pipe.

It will be noted that in the equipment shown in this figure there is no triple valve device, the control of the application of the brakes being by the valve mechanism 51.

The valve mechanism 51 is quite similar in many respects to the valve mechanism 5, the chief difference being that the mechanism 51 is provided with a supply valve 55 and a suitable lever arrangement for effecting the operation of both the supply valve and the exhaust or release valve. In view of this a description of only the supply valve and the lever arrangement and the operation of the lever arrangement to control the operation of the supply and release valves is all that is deemed necessary to a clear understanding of this form of the invention. In this form of the invention, the chamber 28 in the casing of the mechanism is in constant open communication through a passage and pipe 56 with the brake cylinder 2 and, as in the mechanism 5, is in constant open communication with the end 34 of the release cylinder 31.

This chamber 28 is adapted to be connected through a passage 57 to a supply chamber 58 which is connected through pipe 59 to the supply reservoir 52, communication between said chamber and reservoir, by way of passage 57, being normally closed by the supply valve 55 which is contained in the chamber 58 and which is maintained in its communication closing position by the action of the spring 60 also contained in chamber 58.

The supply valve is provided with an extension 51 which is pivotally connected by means of a pin 62 to one end of a floating lever 63. The other end of this lever is pivotally connected, by means of a pin 64, to an extension 65 of the release valve 26.

Extending at an angle to the lever 63 is an operating rod 66 which at one end is operatively connected, by means of a pin 67, to the arm 22 of the rocking lever and which, at its other end, is pivotally connected, by means of the pin 68, to the lever 63 at a point intermediate the ends of the lever.

In operation, to charge the apparatus fluid under pressure is supplied to the brake pipe 3 in the usual manner. From the brake pipe 3 fluid under pressure flows through pipe 53 past the check valve 54 to the supply reservoir 52 and supply chamber 58 by way of pipe 59 and also flows through passage 16 to the chamber 15 in the casing of the valve mechanism and from said chamber 15 flows to the end 14 of the cylinder 12.

Under release conditions the control piston 13 is maintained at the right hand or control chamber end of its cylinder 12, as shown, and the control chamber 6 is charged with fluid from the opposite end 14 of the control cylinder 12 through a feed groove 40 which is uncovered when the control piston 13 occupies this position. The release piston 30 is maintained in its extreme left hand position as shown within its cylinder 31 under the action of the control spring 37 and at the same time the arm 22 of the rocking lever acting through the medium of the rod 66 and floating lever 63 maintains the release valve 26 in its unseated or open position as shown.

Under these conditions, it will be evident that the pressure obtained at both ends 14 and 17 of the control cylinder 12 and in the control chamber 6 is the normal or standard brake pipe pressure, while, owing to the release valve 26 being unseated, the brake cylinder is open to the atmosphere by way of pipe and passage 56, chambers 28 and 34, port 29, release cylinder 31, and the port 36.

When the brake pipe pressure is reduced upon initiating an application of the brakes, the pressure of fluid in chamber 15 and in the left hand end 14 of the cylinder 12 correspondingly reduces and the piston 13 accordingly moves toward the left, covering the feed groove 40 and permitting the fluid contained in the control chamber 6 to expand into the space at the end 17 of the cylinder 12 on the right hand side of the control piston 13 due to its movement towards the left. The pressure in the control chamber 6 is thus reduced, the movement of the control piston 13 continuing until this pressure is equal to the pressure in the end 14 of the chamber 15 on the opposite of the piston 13 so that the position eventually assumed by the control piston 13 will accurately correspond to the reduction in brake pipe pressure.

It will be noted that since the pressures on the sides of the piston 13, in the position finally assumed thereby, are substantially equal to one another, as was the case before this movement of the piston 13 took place, there is no tendency for fluid to escape from the control chamber 6 past the piston 13.

The movement of the control piston 13 transmitted through the arms 21 and 22 of the rocking lever will cause the pin 67 and rod 66 to move in a direction toward the right hand, the rod in its movement causing the lever 63 to rock about the pin 62 and close the release valve 26, the spring 60 being of such a value that it will maintain the supply valve 55 seated while the release valve 26 is being closed. After the release valve is closed, that is to say, seated on the release piston 30, the continuous movement of the rod 66 toward the right causes the lever 63 to rock about the pin 64 and thereby unseat the supply valve 55 whereupon fluid under pressure flows from the supply reservoir 52 by way of passage and pipe 59, supply chamber 58, passage 57, chamber 28 and passage and pipe 56 to the brake cylinder 2.

Fluid at brake cylinder pressure in chamber 28 and in the end 34 of the cylinder 31 will cause the release piston 30 to move toward the right against the action of the control springs 37. If the desired reduction in brake pipe pressure has been effected and the piston 13 has come to rest, the spring 60 acts to move the supply valve 55 to its seated position as the movement of the release piston 30 continues. When the supply valve seats it closes off the supply of fluid under pressure to the chamber 28 and brake cylinder 2 and since no further increase in chamber 28 will occur the release piston 30 will come to a stop and the release valve 26 will remain closed.

It will here be understood that the brake cylinder pressure at which this action occurs for a particular position of the piston 13 is dependent upon the strength of the control spring 37 which is so proportioned or adjusted that the desired brake cylinder pressure for a given reduction in brake pipe pressure will be obtained.

The brake cylinder pressure can be further increased as desired by effecting a further reduction in brake pipe pressure whereupon the control valve mechanism will operate in a similar manner to that above described, the piston 13 being moved to a position further towards the left and effecting, through the rocking lever and the floating lever, the reopening of the supply valve 17 which is reclosed by the movement of the release piston 30 towards the right as soon as the higher brake cylinder pressure has been established.

When it is so desired to effect a graduated release of the brakes, the brake pipe pressure is increased to an extent dependent upon the degree of release desired. The piston 13 consequently moves toward the right and through the action of the rocking lever unseats the release valve 26 by rocking the floating lever 63 about the pin 62 connected to the supply valve 55 which is held closed by spring 60. Fluid is thereby permitted to exhaust from the brake cylinder to the atmosphere through pipe and passage 56, chamber 28, past the open release valve 26, through passage 29, end 35 of the cylinder 31 and port 36 until, as a result of the reduced brake cylinder pressure, the release piston 30 moves towards the left under the action of the control spring 37 to a sufficient extent to bring the valve seat in the release valve port 29 into engagement with the release valve 26 and thus prevent further flow of fluid from the brake cylinder.

Further successive reductions in brake cylinder pressure may be effected in a similar manner by correspondingly increasing the brake pipe pressure in any desired number of steps or increments until when this pressure is fully restored to its normal value the piston 13 is again in its extreme right hand position and the release piston is in its extreme left hand position with the release valve 26 opened as shown in the drawings.

From this it will be evident that the improved control valve device enables the application and release of the brakes to be accurately graduated in accordance in variations in brake pipe pressure, the normal or standard pressures in the brake pipe and in the control chamber being of any desired value required to meet operating conditions.

It will be understood that a graduating valve device constructed in accordance with the invention will operate satisfactorily at any desired normal brake pipe pressure as distinct from devices previously proposed involving a control spring which must be replaced or readjusted for each normal or standard pressure of operation of the braking apparatus, while as above explained, the invention avoids the disadvantage of prior devices utilizing the pressure in a control chamber as a control element as regards the possibility of leakage of fluid from this chamber which would interfere with the proper operation of the device.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, in combination, a brake cylinder, a brake pipe, a valve device for controlling the release of fluid from the brake cylinder comprising a release piston subject to the opposing pressures of the brake cylinder and a spring, a control piston subject to the opposing fluid pressures of the brake pipe and a chamber, a pivoted lever operatively connected at one end to said control piston, and a valve having lost motion connection with said release piston and with the other end of said lever and being operative according to the joint action of said lever and release piston for controlling the release of fluid from the brake cylinder, the lost motion connection between the lever and valve permitting a limited movement of the valve in one direction relative to the lever and the lost motion connection between the valve and release piston permitting movement of the release piston in the same direction relative to the valve and for permitting movement of the release piston in the opposite direction relative to the valve.

2. In a fluid pressure brake, in combination, a brake pipe, a brake cylinder, a brake controlling valve device operated upon an increase in brake pipe pressure following an application of the brakes for connecting the brake cylinder to an exhaust port, a valve for controlling communication from said exhaust port to the atmosphere, said valve being movable by fluid under pressure in the exhaust port to a communication controlling position, means positioned according to the degree of increase in brake pipe pressure for limiting the movement of said valve, a spring, and a movable abutment subject to the opposing pressures of said spring and fluid under pressure in the exhaust port operative by said spring, upon a reduction in the pressure of fluid in the exhaust port, into engagement with said valve to close said communication, said valve being movable by said means out of engagement with said abutment upon a further increase in brake pipe pressure to again open said communication and said abutment being operative into engagement with said valve upon a further reduction in the pressure of fluid in the exhaust port to again close said communication.

3. In a fluid pressure brake, in combination, a brake pipe, a brake cylinder, a brake controlling valve device operated upon a reduction in brake pipe pressure to supply fluid under pressure to the brake cylinder, and operated upon an increase in brake pipe pressure following the reduction therein for connecting the brake cylinder to an exhaust port, a valve adapted to control communication from said exhaust port to the atmosphere, said valve being movable by fluid under pressure in the exhaust port to a communication controlling position, means positioned according to the degree of reduction in brake pipe pressure and the subsequent increase in brake pipe pressure for limiting the movement of said valve, a spring, and means subject to the opposing pressures of said spring and fluid under pressure in the exhaust port operative by said spring, upon a reduction in the pressure of fluid in the exhaust port, into engagement with said valve to close said communication.

4. In a fluid pressure brake, in combination, a brake pipe, a brake cylinder, valve means for controlling the venting of fluid from the brake cylinder in effecting a release of the brakes, control means positioned according to a reduction in brake pipe pressure in initiating an application of the brakes and a subsequent increase in brake pipe pressure in initiating the release of the brakes for controlling the operation of said valve means, said control means comprising a movable abutment normally subject on one side to brake pipe pressure and on the opposite side to a fluid pressure substantially equal to brake pipe pressure and movable in one direction by fluid under pressure on said opposite side thereof upon said reduction in brake pipe pressure to effect a corresponding reduction in the pressure of fluid on said opposite side and being movable in the opposite direction upon said subsequent increase in brake pipe pressure until the pressure of fluid acting on said opposite side is increased, by the movement of said abutment, to equal that of the increased brake pipe pressure.

5. In a fluid pressure brake, in combination, a brake pipe, a brake cylinder, a brake controlling valve device operated upon a reduction in brake pipe pressure to supply fluid under pressure to the brake cylinder and operated upon an increase in brake pipe pressure following the reduction in brake pipe pressure for connecting the brake cylinder to an exhaust port, a valve for controlling communication from said exhaust port to the atmosphere, said valve being movable by fluid under pressure in the exhaust port to a communication controlling position, means operative according to the degree of reduction in brake pipe pressure and the subsequent increase in brake pipe pressure to a position for limiting the movement of said valve, a lost motion connection between said means and valves to permit movement of said means without opposition by said valve, and means operative upon a reduction in the pressure of fluid in the exhaust port into engagement with said valve to close said communication.

6. In a fluid pressure brake, in combination, a brake cylinder, a brake pipe, a valve device for controlling the release of fluid under pressure from the brake cylinder comprising a release piston subject to the opposing pressures of the brake cylinder and a spring, a control piston subject to the opposing fluid pressures of the brake pipe and a chamber, and valve means having a lost motion connection with said control piston and operative according to the joint action of said pistons for controlling the release of fluid from the brake cylinder, said lost motion connection permitting free movement of the control piston and valve means relative to each other.

7. In a fluid pressure brake, in combination, a brake cylinder, a brake pipe, a valve device for controlling the supply of fluid under pressure to and the release of fluid under pressure from the brake cylinder and comprising a release piston subject to the opposing pressures of the brake cylinder and a spring, a control piston subject to the opposing fluid pressures of two chambers arranged one at each side of the piston and normally charged with fluid at brake pipe pressure and operative upon a variation in the pressure of one of said chambers to correspondingly vary the pressure in the other of said chambers, and valve means operative according to the joint action of said pistons for controlling the supply of fluid under pressure to and the release of fluid under pressure from the brake cylinder.

ARTHUR WILLIAM SIMMONS.